Aug. 28, 1962    R. C. REMINGTON    3,051,007
VERTICAL SENSING DEVICE
Filed Sept. 26, 1960
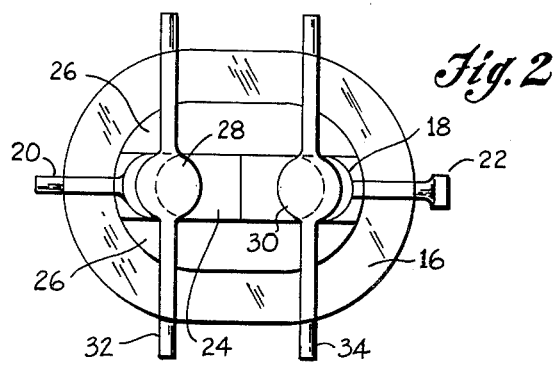
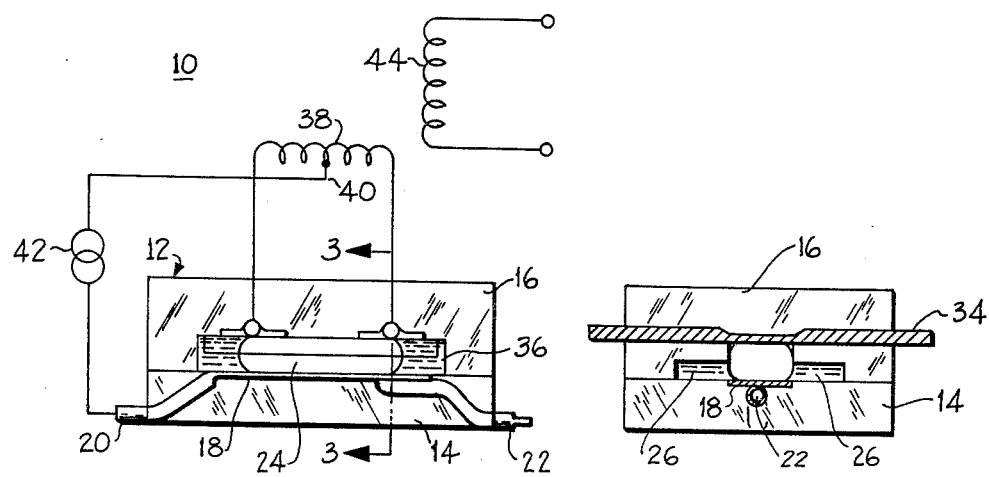
RICHARD C. REMINGTON
INVENTOR.
BY Andrew L. Bain
Sal A. Giarratana
ATTORNEYS 3,051,007
VERTICAL SENSING DEVICE
Richard C. Remington, Pompton Plains, N.J., assignor to General Precision Inc., Little Falls, N.J., a corporation of Delaware
Filed Sept. 26, 1960, Ser. No. 58,545
7 Claims. (Cl. 74—5.47)

The present invention relates to a bubble type vertical sensing device and more particularly to a vertical sensing device having improved vibration and cross-coupling error limitation characteristics.

In general, the present invention relates to means for detecting departure of an axis of a body from a referenced position and for generating a discriminatory signal for energizing a correcting means to rectify the deflection of the axis. For example, gyroscopic instruments, such as vertical gyros or artificial horizon gyros, mounted on an unstable platform, for example, an aircraft, require means for erecting the vertical gyro of the artificial horizon gyro by the application of a corrective torque to the gyroscope. The departure of an axis of the gyro from the vertical, such as the spinning axis in the case of an artificial horizon or vertical gyro, is detected by a vertical sensing device which transmits a signal to a power means, such as a torque motor, to apply a corrective torque to the gyroscope. The corrective torque supplied to the gyroscope returns the spinning axis to a vertical position.

The vertical sensing device for detecting departure from the vertical may be of the type disclosed in an application relating to "Bubble Type Electrolytic Reversible Switch," by Richard C. Remington and David J. Schauffler, Serial No. 858,471, and now Patent No. 3,020,506, assigned to the assignee of the present application. However, a single axis electrolytic vertical sensing element is endowed with certain operational limitations because of cross-coupling errors due to tilting of the device in an axis opposite to the sensitive axis about which the tilt is measured. In addition, presently used vertical sensing elements of the single axis electrolytic type are endowed with inherently poor dampening characteristics which permits the bubble in the electrolyte to over-shoot. Also, such a single axis electrolytic vertical sensing device possesses undesirable vibration characteristics which cause the bubble to break up into smaller bubbles or to foam which destroys the effectiveness of the device.

In such gyroscopic instruments as an artificial horizon unit, the gyroscope is mounted in neutral equilibrium on horizontal axes and the spinning axis is maintained in the direction of gravity by the application of torque about the horizontal axis of suspension, and, usually controlled by gravity-responsive elements such as pendulums, so that the gyroscope is restored to the vertical without oscillation if it should temporarily depart therefrom. In direction or course indicators, the gyroscope is mounted in neutral equilibrium and provided with torque means holding the spinning axis in a horizontal position. The torque means exert a torque on the gyroscope whenever it departs from the horizontal position so as to cause the gyroscope to precess and return to the horizontal position.

Accordingly, to maintain the setting of the gyroscope in gyroscopic instruments in a predetermined attitude irrespective of accelerations or other influences to which the instrument may be subjected, gravity responsive means are utilized to control the application of torque to restore the gyroscope to its original position. These gravity responsive means are useful in the erection of a gyroscope, or a gyroscopically stabilized platform, that is, to initially orient the spin axis of the gyroscopes along a desired direction. In general, these presently used gravity responsive means utilized to exert a suitable torque to offset the departure of a gyroscope from its initial desired direction due, for example, to friction in the bearings and reaction to the earth's rotation, generate torque by the reaction of air jets or the use of a continuously variable electrical resistance level device. In a level type device, the liquid controls the electric current energizing the torque means by the reaction of the liquid to gravity. In such a level device, the gravity responsive liquid constitutes the variable resistance which will continuously control the energization of the torque means in response to the deviation, for example, of the spin axis from its initial position.

The present invention comprises a gravity-responsive level device endowed with improved vibration and cross-coupling error limitation characteristics. The level device is provided with a casing having an electrolyte chamber specifically designed to permit the electrolyte bubble freedom only along a single axis. The bubble is restricted in a sensitive position in operative contact with a number of axially aligned electrodes provided within the casing, so that the bubble in the horizontal position of the level is in contact with equal portions of each electrode. Another electrode is provided within the casing in contact with a substantial portion of the bubble chamber, so that the bubble is always in contact with it, regardless of the attitude of the device. The electrolyte chamber is formed with a bubble chamber having a number of fluid return grooves associated therewith to allow circulation of the electrolyte around the bubble while controlling the damping characteristics of the device. The return grooves are of a suitable dimension to prevent the bubble from entering therein because of the capillary attraction of the electrolyte for the return grooves having a smaller cross-sectional area relative to the bubble chamber.

In the present device, with the bubble chamber in a horizontal position, the paths of current extending between the electrodes through the conductive fluid have the same length and the same resistance. Consequently, the counteracting windings of a torque motor controlled by the level device are equally energized and balance one another so that the motor produces no torque, for example, to erect the gyroscope. However, as the level device is displaced about its sensitive axis, the bubble moves to contact one electrode more than the other, so that the area of contact between one of the electrodes and the conductive liquid will increase while the area of contact between the other substantially coplanar electrode and the conductive liquid decreases. Hence, in the tilted position the current path between two of the electrodes is shorter, while the remaining path becomes longer. Thus, the two counteracting windings of the torque motor will no longer balance each other and the energization of one winding will overcome that of the other to produce a torque on the gyroscope, such as on the gyro gimbal, which is substantially in proportion to the departure of the bubble from its center or neutral position. The generated torque thus produces a precessional motion in the gyro to return the spin axis to its initial oriented position.

The present invention results in a single axis vertical sensing device used, for example, for gyroscopes as a vertical reference, with improved vibration performance through better damping control and less error due to cross-accelerations. In this manner, initial erection of a gyroscope will remain as good if not better than gyroscopes using two axis vertical reference devices having two sensitive axes perpendicular to each other; and much better than gyroscopes using a standard or presently known types of single axis vertical reference device. In addition, the present single axis vertical sensing device performs without loss of sensitivity in any attitude, even in an inverted position or any other cross-axis positions from 180° out of vertical to vertical.

An object of the present invention is the provision of a bubble type vertical sensing device having improved operating characteristics in any operational attitude.

Another object is to provide a gravity-responsive means with sensitivity through 360° cross-axis tilt.

A further object of the invention is the provision of a vertical sensing device having improved vibration, damping, and cross-coupling error limitation characteristics.

Other objects and many of the attendant advantages of this invention will be readily appreciated as the same becomes better understood, by reference to the following detailed description when considered in connection with the accompanying drawing in which like reference numerals designate a like part throughout the figures thereof and wherein:

FIGURE 1 is a cross-sectional view of a preferred embodiment of the invention including the circuit arrangement associated therewith;

FIGURE 2 is a plan view of the device shown in FIGURE 1; and

FIGURE 3 is a sectional view of the gravity responsive device taken along line 3—3 of FIGURE 1, looking in the direction of the arrows.

Referring now to the drawings, there is illustrated a preferred embodiment 10 comprising a hermetically sealed housing 12 having a substantially oval shape which may be suitably attached to a gyroscope, not shown. The housing consists of a lower portion 14 and a complementary upper portion 16 joined together to produce the hermetic seal. The housing 12 is composed of a suitable insulating material, such as glass, and serves to encapsulate the gravity-responsive structure. The lower housing portion 14 is provided with a metallic electrode 18, composed of platinum, or the like, having an electrode terminal 20, extending through the lower house portion, and, further formed with an integral metal tube 22 having an end portion protruding from the lower housing to facilitate supplying electrolyte to the interior of the housing, as hereinafter disclosed.

The upper house portion 16 is formed with a substantially T-shaped bubble chamber 24 provided with by-pass grooves 26 on each side thereof, as shown in FIGURE 3. A pair of electrodes 28 and 30 are encapsulated substantially coplanar within the upper housing portion with their operating surface exposed to the bubble chamber, and provided with integral electrode terminals 32 and 34 respectively, protruding from each side of the housing. The bubble chamber is provided with a top surface formed with a slight inclination from the apex at the center of the chamber to the ends thereof, to control the sensitivity of the bubble in its movement within the chamber. The structural coaction of the lower and upper house portions hermetically use the bubble chamber with electrodes 18, 28 and 30 in operative contact therewith. The bubble chamber and the by-pass grooves are filled with a suitable conductive liquid 36, such as Kearfott K-81 electrolyte, or the like, to a predetermined amount. The conductive liquid is provided with a bubble which may consist of air, gas or some other insulating medium, such as oil. The dimension of the bubble is controlled by the relative sizes of the bubble chamber and the size and position of the electrodes, which, in turn, are a function of the specific output desired from the unit. In general, the bubble 24 is dimensioned so that the electrodes 28 and 30 are partly covered by an equal amount when the level is in normal operating position.

FIGURE 1 discloses a typical circuit arrangement showing the method of connecting the level sensing device to a torque motor to transmit the angular deviation of the sensing element from its normal position; for example, to erect a gyroscope or to restore the spin axis of a gyroscope to an initially oriented direction. Specifically, electrode terminals 32 and 34 are connected to the respective ends of a control phase winding 38 of the torque motor, which, in turn, is provided with a center tap 40 connected to a power source 42. The electrode terminal 20 is connected to the power source 42 to complete the circuit. A fixed phase winding 44 is provided co-operating with the control phase winding to complete the torque motor installation. Accordingly, power is applied from the center tap 40 to the terminal 20 and the current is proportional to the angle-of-tilt of the level device since the conductive fluid 36 acts as a variable electrical resistance between the electrodes.

The present invention, as exemplified in the preferred embodiment 10 eliminates cross-coupling errors due to tilt in an axis opposite to the sensitive axis about which the tilt is measured, so that the sensitivity voltage output with respect to tilt is unaffected by cross-axis tilting through 360°. Also, damping, which is defined as the ability of the level device not to overshoot, is accomplished by suitably designing the cross-sectional area of the by-pass grooves 26 to control the flow rate of the fluid. The preferred embodiment is endowed with improved vibration characteristic to prevent the bubble within the bubble chamber from breaking up into smaller bubbles or foaming. The vibration characteristics are improved by damping and actual design of a proportional output device. That is, the bubble is restricted or confined in the bubble chamber and is allowed motion only in the sensitive direction, between the electrodes 28 and 30, to thereby reduce the tendency of the fluid to foam.

If desirable, the damping of the level device can be realized by replacing the by-pass grooves 26 with a passageway connecting both ends of the bubble chamber, provided with a damping orifice or construction, so that damping can be controlled by the predetermined dimensioning of the passageway and the orifice. In brief, the bubble remains within the bubble chamber at all attitudes of the level device as a result of the inherent surface tension of the bubble and because of the capillary attraction of the conductive fluid for the smaller by-pass grooves.

In the operation of the preferred embodiment 10, as long as the bubble assumes the central position shown in FIGURE 1, the paths of current from the electrode 18 through the conductive fluid 36 to the electrodes 28 and 30 have the same length and the same resistance. Hence, the control phase winding of the motor is equally energized on both sides of the center tap 40 and balanced so that the motor produces no torque on the gyroscope instrument. However, if the spin axis of the gyroscope departs from its initial oriented position, the bubble 24 moves from its central position in an amount proportional to the angle-of-tilt. The area of contact between the electrodes 28 and 30 with the conductive fluid 36 is no longer proportional and the effect is of shortening the path of current between the electrode 28 or 30, depending on the direction of tilt, with the electrode 18. At this time, the control phase winding is no longer balanced about the center tap, and will produce a torque on the gyroscope which is substantially in proportion to the departure of the bubble 24 from its central position. The torque thus produced causes the gyroscope to perform a precessional motion which restores the spinning axis of the gyroscope to its initial oriented position.

It should be understood, of course, that the foregoing disclosure relates only to a preferred embodiment of the invention and that it is intended to cover all changes and modifications of the example of the invention herein chosen for the purposes of the disclosure, which do not constitute departures from the spirit and scope of the invention as set forth in the appended claims.

What is claimed is:

1. A gravity responsive device adapted to erect a gyroscope, comprising a tiltable hermetically sealed housing, said housing being tiltable relative to the longitudinal axis of the fluid chamber, a fluid chamber within said housing, having fluid by-pass means on either side thereof, conductive fluid means within said fluid chamber, a bubble within said fluid chamber, said fluid chamber being in the form of multiple parallel-faced connected cavities, said bubble extending through substantially the entire height of the fluid chamber, a pair of electrodes within said housing axially spaced along the longitudinal axis of said fluid chamber and in operative contact with said bubble, a third electrode within said housing in operative contact with said bubble and spaced from said pair of electrodes by said fluid chamber, said electrode and bubble combination being adapted to indicate the angular displacement of the housing relative to the nominal position thereof regardless of the position of the electrodes relative to the bubble, a torque motor coupled to each of said electrodes and responsive to a differential current flow through said fluid means and between said electrodes, wherein the current flow is proportional to the angle of tilt of said housing.

2. A vertical sensing device comprising a tiltable housing having a fluid chamber centrally located within said housing, said fluid chamber being relatively straight over its entire length, said housing being tiltable relative to the longitudinal axis of the fluid chamber, said fluid chamber being in the form of multiple connected parallel-faced cavities, a conductive fluid within said chamber, a pair of axially spaced electrodes located within said housing along the longitudinal axis of the fluid chamber, said pair of electrodes being operative contacting said fluid chamber, a third electrode within said housing in operative contact with said fluid chamber and operatively coacting with said pair of electrodes through said conducting fluid, said third electrode being spaced from the pair of electrodes by the fluid chamber, terminal means associated with each of said electrodes, a torque motor, means coupling said electrodes to said torque motor, a bubble within said conductive fluid operatively contacting said electrodes, said bubble extending over substantially the entire height of the fluid chamber, so that in the normal position of the sensing device, said bubble contacts equal portions of the longitudinally spaced electrodes and the current flow from said third electrode to each of said pair of electrodes is substantially equal, said bubble adapted to move within said fluid chamber as a function of the tilting of said housing about the sensitive axis of said fluid chamber, said electrode and bubble combination being adapted to indicate the angular displacement of the housing relative to the nominal position thereof, regardless of the position of the electrodes relative to the bubble, said torque motor being responsive to a differential current flow through said conductive fluid, and between said electrodes, wherein the current flow is proportional to the angle of tilt of said housing.

3. A vertical sensing device for controlling the flow of current as a function of the inclination of the device with respect to its normal position, comprising a hermetically sealed housing having an integral fluid chamber, said fluid chamber being in the form of multiple parallel-faced connecting cavities, each of said cavities being of substantially rectangular cross section, said fluid chamber being substantially straight over its entire length, conductive fluid means within said chamber, a pair of electrodes axially spaced within said chamber along the longitudinal axis of said fluid chamber, said fluid chamber being substantially straight and co-axial with the longitudinal axis thereof, over its entire length, and in operative contact with said fluid means, a third electrode within said chamber, an insulating bubble within said conductive fluid means in operative contact with all of said electrodes, said third electrode being in operative contact with the insulating bubble, and spaced from said pair of electrodes by said fluid chamber, so that one of said pair of electrodes has a different resistance to the passage of current from the other of said pair of electrodes when said housing is tilted, said electrodes being adapted to indicate the tilt of the housing regardless of the position of the electrodes relative to the bubble, the connecting cavities in said chamber being operative to maintain the path of said bubble along the longitudinal axis of said chamber for any degree of cross-axis tilt, and a torque motor coupled to said pair of electrodes and the third electrode, said torque motor being responsive to a differential current flow through said fluid means and between the third electrode and the pair of electrodes, wherein the current flow is proportional to the angle of tilt of said housing.

4. A vertical sensing device for controlling electric current passing therethrough as a function of the position of the device with respect to a normal position, comprising a hermetically sealed casing, said casing having a fluid chamber centrally located therein, said fluid chamber consisting of a cavity of rectangular cross-section along a plane perpendicular to the longitudinal axis of the casing, and a bypass parallel-faced cavity connected to the rectangular cavity, said fluid chamber being substantially straight and co-axial with the longitudinal axis thereof over its entire length, a conductive fluid within said fluid chamber, a pair of axially aligned electrodes within said casing in contact with said conductive fluid, said conductive fluid having an insulating bubble means therein, a bubble chamber restricting the movement of said bubble means along the longitudinal axis of the chamber, said bubble extending through substantially the entire height of the bubble chamber, a third electrode within said casing in continuous contact with said bubble means, said third electrode being spaced from the pair of electrodes by the fluid chamber, said bubble means positioned within said bubble chamber so as to contact equal portions of said pair of longitudinally aligned electrodes when said casing is in its normal position and contacting the surface of one of said pair of longitudinally aligned electrodes to a greater extent than the other of said electrodes when said casing is tilted, said electrode and bubble combination being adapted to indicate the degree of tilt of the casing regardless of the position of the electrodes relative to the bubble, and a torque motor coupled to said pair of electrodes and the third electrode, said torque motor being responsive to a differential current flow through said fluid means and between the third electrode and the pair of electrodes wherein the current flow is proportional to the angle of tilt of the housing.

5. A vertical sensing device comprising a transparent housing having a fluid chamber, said fluid chamber being in the form of multiple parallel-faced connecting cavities, said fluid chamber being substantially straight over its entire length, a pair of electrodes within said housing, axially spaced along the longitudinal axis of the fluid chamber, and in operative contact with said fluid chamber, a third electrode within said housing in operative contact with said fluid chamber, and spaced from the pair of electrodes by the fluid chamber, a conductive fluid within said chamber and in operative contact with said electrodes, a bubble within said conductive fluid operatively contacting said electrodes, said bubble extending over substantially the entire height of the fluid chamber, the multiple parallel-faced cavities being operative to maintain said conductive fluid in operative contact with said electrodes in any attitude of said transparent housing, a torque motor coupled to each of said electrodes and responsive to a differential current through said conductive fluid, and between said electrodes, wherein the current flow is proportional to the angle of tilt of said housing.

6. A vertical sensing device comprising a transparent housing having a fluid chamber through substantially the center thereof, said fluid chamber consisting of multiple parallel-faced connecting cavities, a conductive fluid partially filling said fluid chamber, said fluid chamber being substantially straight over its entire length, a pair of electrodes within said housing and in operative contact with the conductive fluid in said fluid chamber, a bubble within said conductive fluid operatively contacting said electrodes, said bubble extending over substantially the entire height of the fluid chamber, said pair of electrodes being axially spaced along the longitudinal axis of the fluid chamber, a third electrode within said housing in operative contact with the bubble, and spaced from said pair of electrodes by the fluid chamber, and the multiple parallel-faced cavities being operative to maintain said conductive fluid in an operative relationship with said electrode means in all operational attitudes of said housing.

7. A vertical sensing device comprising a substantially transparent tiltable housing having a fluid chamber centrally located therein, said fluid chamber being in the form of multiple parallel-faced connecting cavities, said fluid chamber being substantially straight and co-axial with the longitudinal axis thereof, over its entire length, said fluid chamber supporting electrically conductive fluid, a bubble within the conductive fluid in said chamber restricting said conductive fluid to single axis operation at all operational attitudes, said bubble extending over substantially the entire height of the fluid chamber, a pair of electrodes within said housing and axially spaced along the longitudinal axis of the housing, said electrodes being electrically coupled to said conductive fluid and the bubble formed therein, a third electrode within said housing and electrically coupled to said conductive fluid and the bubble formed therein, said third electrode being spaced from the pair of electrodes by the fluid chamber, the current flow between the pair of electrodes, the conductive fluid and the third electrode being proportional to the angle of tilt of said housing, the combination of said pair of electrodes, the third electrode and the bubble being operative to indicate the angular displacement of the longitudinal axis of the housing relative to the nominal position thereof, regardless of the position of the electrodes relative to the bubble.

References Cited in the file of this patent

UNITED STATES PATENTS

| | | |
|---|---|---|
| 2,367,465 | Kunzer | Jan. 16, 1945 |
| 2,830,160 | Engel et al. | Apr. 8, 1958 |
| 2,834,215 | Deer | May 13, 1958 |
| 2,836,071 | Pasquet | May 27, 1958 |
| 2,986,946 | Sulmer | June 6, 1961 |

FOREIGN PATENTS

| | | |
|---|---|---|
| 1,102,075 | France | May 4, 1955 |
| 811,036 | Great Britain | Mar. 25, 1959 |